J. MOSES.
Dishes of Pottery Ware.

No. 160,539. Patented March 9, 1875.

Attest:
J. Mason Gosler
August Jamieson

Inventor:
James Moses
By N. Crawford atty.

THE GRAPHIC CO. PHOTO-LITH. 39 & 41 PARK PLACE, N.Y.

UNITED STATES PATENT OFFICE.

JAMES MOSES, OF TRENTON, NEW JERSEY.

IMPROVEMENT IN DISHES OF POTTERY-WARE.

Specification forming part of Letters Patent No. 160,539, dated March 9, 1875; application filed January 25, 1875.

*To all whom it may concern:*

Be it known that I, JAMES MOSES, of Trenton, in the county of Mercer, in the State of New Jersey, have invented certain Improvements in Dishes made of Potter's Ware, of which the following is a specification:

The invention consists in constructing and finishing dishes of potter's ware in the manner as will be fully hereinafter described.

Figure 3:
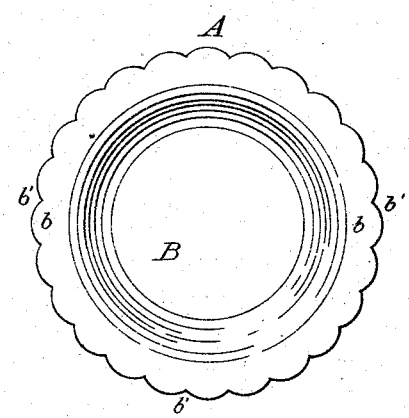
Figure 4:
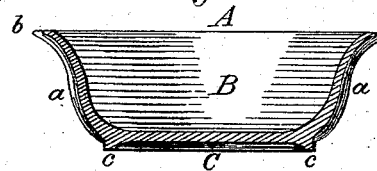
Figure 1:
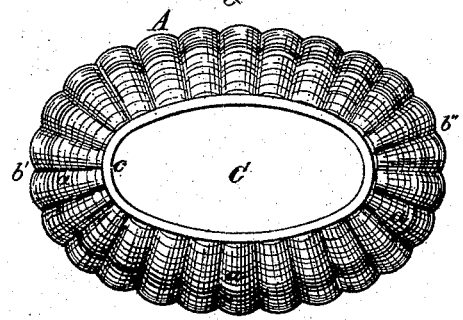
Figure 2:
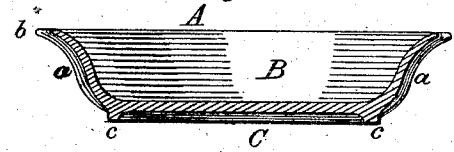

In the drawings, Figure 1 represents the bottom and outside of an oval dish; Fig. 2, a sectional view of same; Fig. 3, the inside of a round dish, and Fig. 4 a sectional view of same.

A represents the outside of the body of the dish, whether round or of other shapes, and has corrugations $a$ upon the outside of the body, and an outwardly-projecting rim, $b$, at the top edge, having scallops $b'$ therein to conform to the corrugations $a$ of the body of the dish. B is the inside of the dish, perfectly smooth from the scallops on the outer edges of the rim through the entire inside of the dish, without stilt or other marks caused by the usual manner of supporting dishes while in the kiln to be baked and finished. C is the smooth bottom, with the usual downwardly-projecting rim $c$, upon which the dish rests.

Dishes have been made with smooth outside and inside, having an outwardly-projecting rim that is either plain, smooth, or scalloped on the outer edge, and in order to ornament or beautify the exterior of dishes, corrugations upon the outside of the body have been made; but a dish that is corrugated upon the outside, having a projecting rim corrugated on its under side, and scalloped or plain on its outer edge, and perfectly smooth on its inside, has not before, to my knowledge, been produced.

The outwardly-projecting rim $b$ makes the dish secure in the hands of the user, as a better hold of the dish is maintained, while the scallops $b'$ on its outer edge are really continuations of the corrugations on the under side of the rim, which also add to the secure hold upon the dish.

The advantage of a smooth inside of the dish and smooth top surface of the projecting rim is, that the dish is better to clean, and no wear of spoons or other table-ware used in the dish, and bearing upon the smooth top surface of the rim, will result.

Having thus described my invention, what I claim, and desire to secure by Letters Patent, is—

In a dish of pottery-ware having corrugations $a$ on its outside, and a smooth interior surface, B, the outwardly-projecting rim $b$, corrugated on its under side and smooth on its upper surface, with or without scallops $b'$ on its outer edge, substantially as shown and described.

JAMES MOSES.

Witnesses:
ROBT. S. GRUEPER,
C. B. VAN DERIPE.